United States Patent Office 3,523,807
Patented Aug. 11, 1970

3,523,807
METHOD OF MAKING A CROSS-LINKED FIBRIN PROSTHESIS
Mihaly Gerendas, 18 Ferenczi I. utca,
Budapest, Hungary
No Drawing. Continuation-in-part of application Ser. No. 277,082, May 1, 1963. This application Nov. 25, 1966, Ser. No. 596,754
Int. Cl. C08h 7/00; A61l 17/00
U.S. Cl. 106—124
4 Claims

ABSTRACT OF THE DISCLOSURE

A process for producing a synthetic prosthetic appliance from the fibrin in clotted blood plasma by molding powdered fibrin to form a shaped prosthetic appliance and thereafter treating said molded prosthetic appliance with a cross-linking agent the same being used in surgical procedures for the preparation of absorptive shaped pieces.

DETAILED DESCRIPTION

This application is a continuation-in-part of my co-pending application Ser. No. 277,082 filed May 1, 1963, now abandoned.

Metals and synthetic plastics have been used in various fields of surgery for the substitution and filling up of tissue deficiencies a long time ago. As the enzymes of the tissue cells are ineffective against the lattice-structure of metals and the chemical bonds of plastics, said substances are not decomposed but remain at the site of implantation. In the course of the development of surgery however several specific operations occurred, where the presence of the implanted substance is necessary only for a certain determined period of time, during the regeneration of the tissue.

The prostheses and interposita serving for the above purpose are to be prepared from a material, which does not cause inflammation, other undesirable tissue-reactions, or hypersensitivity when implanted into the organism and is decomposed and absorbed after having completed its task or after a predetermined period of time.

Several attempts are known for the solution of the above problem. E. R. Lieberman (British Pat. 866,628) prepared films from collagen by centrifuging. According to Davis and Geck, Inc. (British Pat. 489,316) tubes for surgical use are prepared by shaping absorptive animal tissues. J. D. Ferry (U.S. Pat. 2,358,802) use fibrinogen, while E. J. Cohn and J. D. Ferry (2,358,803) used fibrinogen and plasma-proteins as starting material for the manufacture of plastics According to Homberg (U.S. Pat. 1,786,488) a mass capable of being colored is prepared from blood and treated then with formaldehyde.

The process of Lieberman is limited to the preparation of films and is unsuitable for the manufacture of shaped pieces. The process of Davis and Geck has the disadvantage that the animal cells and tissues cause hypersensitivity when implanted into the human organism. The fibrinogen used in the process of Ferry and Cohn and Ferry is a highly hydrophilous substance, thus the preparations made thereof swell, soften and change their shape under the influence of the tissue fluid; thus they are unsuitable for the direction of the regeneration. Also fibrin prepared from purified fibrinogen may not be used for the manufacture of shaped pieces for surgical purposes, because the amount of the "Fibrin Stabilizing Factor" decreases in the course of purification, as a result thereof the stability of the product is not satisfactory. Moreover the process of Ferry and Cohen is circumstantial and expensive and the absorption-time of the preparations can not be varied and regulated in an appropriately wide range. The process of Homberg is directed to the manufacture of plastics capable of being colored, e.g. buttons; the hardening of same is carried out according to Homberg with a 35–40% formaldehyde, which denaturalizes the protein and makes it unsuitable for being absorbed in the living organism. Thus according to the method of Homberg blood-proteins are used for a different purpose, while formaldehyde is applied in a different concentration and for another purpose, than in my process. Thus said anteriority cannot destroy the novelty of my process.

According to my process fibrin prepared by means of natural clotting is used for the preparation of absorptive surgical shaped pieces. The fibrin thus formed in the presence of the "Fibrin Stabilizing Factor" is insoluble. The shaped pieces prepared thereof are similarly insoluble so that they do not dissolve when implanted between the tissues. They keep their shape and are decomposed only later, under the proteolytic effect of the enzymes of tissue cells. Therefore said preparations attain their objective and are suitable for the direction of the regeneration. After having completed their task the preparations finally are decomposed and absorbed tracelessly. I have designated the substance prepared in my process "Bioplast"— in view of the biological function thereof.

Surgical experiences showed, however, that the substance thus obtained was unsuitable for a wide and extensive use. On the one hand fibrin may be prepared from blood only in a small amount (0.1–0.2%) so that the continuous manufacture thereof could not have been ensured, while on the other it has been found on the basis of pharmacological and clinical experiments that one of the most important factors of successful practical use is the absorption-time of the implanted substance. The form-pieces prepared in the beginning had generally so short an absorption-time that it was necessary to elaborate a process by means of which the absorption-time of the shaped pieces may be regulated in wide ranges. Thus with the aid of my experiments I have elaborated a process, which enables on the one hand the use of structure-proteins as Bioplasts, while on the other the regulation of the absorption time of the implanted shaped pieces, depending on the purpose of application.

According to my process fibrin is clotted from the blood-plasma on addition of a calcium chloride solution in the first step. I proceed similarly when a crude plasma-fraction, e.g. the fibrin-containing fraction obtained as a by-product of the production of gamma-globulin is used as starting material for the recovery of fibrin. The clot obtained is ground, washed with tap-water and acetone, dried at room-temperature, powdered, screened and molded to shaped pieces. On testing the properties of the stamped substance I have found that skeleton-proteins (myosin, actin, collagen, elastin) consisting of long chain-molecules (linear-molecules; similarly to fibrin) used in themselves or in combination with fibrin exhibit an advantageous effect on the mechanical properties of the preparations and may be implanted into the organism as homologous substances.

Said proteins may be isolated by methods known per se. Thus the muscle-proteins may be obtained by grinding the muscle-tissue and adding to the muscle-pulp 2–5% of KCl (preferably 4% of potassium chloride), 0.05–0.3% of sodium carbonate (preferably 1% of $Na_2CO_3$) and 0.1–0.6% of $NaHCO_3$ (preferably 3% of sodium hydrogen carbonate). Myosin can be dissolved within an hour. If dissolving is carried out for 24 hours, not only the myosin, but also the actin is dissolved. The remaining residual muscle-particles are then separated by centrifuging, the supernatant liquid is diluted with water to a 5–10-fold volume and neutralized with a 0.1 N hydrochloric acid solution. The dissolved-muscle-proteins precipitate and swiftly deposit. The separated precipitate is washed with ethanol or acetone, dried at room-temperature, powdered and screened.

Absorptive shaped pieces are molded or pressed by admixing the powdered and screened proteins separately, or in combination with each other or with fibrin with different amounts of water. The ratio of powdered protein and water may vary in the range of 1:1 and 10:1 in the different preparations. The mixture is then placed into a molding tool die and stamped to shaped pieces at a temperature in the range of 100–150° C. (preferably at 140° C.) under a pressure of 100–600 kg./cm.$^2$ (preferably 300 kg./cm.$^2$) by using a stamping time of 1–10 minutes.

Bioplasts made of fibrin or the above enumerated structure-proteins meet the surgical requirements only if the absorption-time and mechanical properties thereof may be varied in wide ranges, so according to my process a chemical treatment is used. Said chemical treatment results in producing crosslinking in the substance; thus the absorption-time of the shaped pieces may be modified.

I have found that formaldehyde is the most suitable substance for the modification of the properties of Bioplasts and for the regulating of the absorption-time. Said compound is linked in the form of methylene bridges between the amino-acid terminal groups of the polypeptide chains of the proteins, so that crosslinking is obtained. In accordance with this invention an aqueous solution of hexamethylene tetramine can also be used as a crosslinking agent in place of formaldehyde. By shaped pieces being absorbed in the organism only such bonds can be formed between the formaldehyde and the protein which may be hydrolysed with warm water or diluted acids. I have solved this problem by using a small formaldehyde concentration (0.5–3%), a temperature of 20–25° C., a pH value in the range of 6.0–8.0 and by carrying out the treatment for 0.5–18 hours. An absorption-time in the range of 2 weeks–10 months may be adjusted by varying the above parameters. If hexamethylene tetramine is utilized it is added to the molding powder in amounts of 0.01% to 1.0% by weight.

According to my experiments if formaldehyde is used in the form of a diluted aqueous solution, cross-links are formed at first in the external layer of the shaped pieces and consequently the water-content of said layer decreases. As the internal parts are still unchanged, internal tension is produced and the substance cracks. Therefore the composition of the bath in which the reticulating-treatment is carried out, should be adjusted with particular care. I have found, that if ethanol is added to the bath, said alcohol penetrates quickly into the inside of the substance and replaces the water. By this means the ethanol prevents welling and cracking. However, when the substance thus treated is taken out quickly from the bath, it desiccates quickly and becomes brittle. On the other hand if plasticisers (e.g. glycerine) are added to the bath, the preparations keep their elasticity. Accordingly beside the 0.5–3.0 of formaldehyde also 30–70% of ethanol and 10–40% of glycerine or an equivalent amount of another polyhydric alcohol are added to the bath.

The effect of formaldehyde is terminated finally by placing the shaped pieces into a 10–80% aqueous solution of mono- or polyhydric alcohols (ethanol, glycerine, ethylene, glycol, propylene glycol) for 12–24 hours. This bath dissolves the formaldehyde diffused into the preparation but yet not bonded in the preparation. The polyhydric alcohol content of the bath adjusts the final elasticity of the shaped pieces.

The preparations thus obtained possess appropriate elasticity and do not swell practically in water or when implanted between the tissues. They may be sterilized by treating in an autoclave at a pressure of 2.2 atm. for 0.5–1 hour. The shaped pieces are embedded perfectly into the tissues and direct regeneration according to the optimal aim.

The prosthetic appliance formed from fibrin clotted by means of natural clotting has the following advantages over the use of fibrin formed by precipitation and freeze drying:

(1) Purification of fibrinogen by means of precipitation is accompanied by losses of 30–50%; on the other hand purification of fibrin by means of washing may be carried out almost without any losses.

(2) According to my process no soluble mass is prepared but shaped pieces which keep their shape between the living tissues, direct the regeneration of the tissues and are decomposed only under the effect of the proteolytic enzymes of the cells.

(3) Fibrin has disadvantageous properties, but if freezed and dried in frozen state it may be used for certain purposes. I have found that fibrinogen and fibrin subjected to freeze drying is so voluminous, that the molding thereof is practically impossible. In my process no freeze drying is used, thus I succeeded in eliminating this expensive and superfluous step.

(4) According to my process the fibrin used as starting material is clotted and prepared in the presence of the Fibrin Stabilizing Factor (FSF; Factor XIII). Thus both the fibrin powder and the surgical shaped pieces prepared thereof possess appropriate stability. This is a fundamental condition of their use for surgical purposes.

(5) According to my process both the conversion of fibrinogen to fibrin and the subsequent purification steps may be carried out at room-temperature. This considerably simplifies my process.

(6) According to my process water can be used as plasticiser instead of the polyhydric alcohols.

(7) According to my process moderate cross linking is formed with formaldehyde, which merely lengthens but does not prevent the decomposition of the substance between the tissues.

(8) Naturally clotted fibrin due to the presence of the fibrin stabilizing factor provides an essential factor in the healing of wounds and damaged tissues which does not occur if other proteins are utilized or if fibrin prepared by natural clotting is not used.

EXAMPLE 1

Preparation of Bioplast buttons for the strengthening of liver-sutures from fibrin powder 10 l. of citrate-containing blood are centrifuged and 250 ml. of a 10% calcium chloride solution are added to the separated plasma. The plasma clots within a few minutes. The clotted plasma is ground and the serum is pressed out. The ground product is washed 5 times with water (the wash waters are changed), whereupon it is washed twice with 200 ml. of acetone in order to remove the moisture and dried finally at room temperature. About 10 g. of fibrin powder may be obtained from 10 l. of blood. Stamping is then carried out by using the following composition:

3.5 g. of ground and screened fibrin powder
1.5 ml. of distilled water.

The fibrin powder is admixed profoundly with the water and the mixture is allowed to stand for 3 hours. The pressed mass is then filled into a molding tool (plane surface: 20 x 100 mm.) and stamped at a temperature of 130° C. with a pressure of 150 kp./cm.$^2$ for 5 minutes. The molding tool is then cooled for 10 minutes, whereupon the piece is taken out.

Sheet-pieces having a surface of 15 x 6 mm. are cut from the sheet thus obtained (surface: 20 x 100 mm., thickness: 2.5 mm.) with a cutting tool. The sides of the pieces are made round and 2 holes are bored. In order to regulate the absorption-time the buttons are put into a bath having the following composition:

|  | Ml. |
|---|---|
| 40% formaldehyde | 2.5 |
| 98% ethanol | 65.0 |
| 90% glycerine | 35.5 |

The preparation is treated in the bath for half an hour. After the treatment the preparation is placed into the following bath, in order to cease the effect of formaldehyde:

|  | Ml. |
|---|---|
| 98% glycerine | 60 |
| 98% ethanol | 30 |
| Water | 10 |

The product is treated in the above bath for 12 hours. Said treatment ensures an absorption time of about 3 weeks for the buttons used by liver operations. The product may be sterilized before operation in an autoclave.

EXAMPLE 2

Preparation of a Bioplast cap for the operation of hip-joint from fibrin and myosin powder Clotted fibrin mass obtained in the Blood-Bank as a by-product of the preparation of pasteurized plasma solution is ground. 100 g. of the ground product are washed with water and acetone, dried at room-temperature and pulverized. Thus about 20 g. dry fibrin powder are obtained from 100 g. of crude fibrin. Myosin powder is prepared from 500 g. of ground muscle. Isolation of myosin is carried out with the following solution:

45.0 g. of KCl
1.0 g. of $Na_2CO_3$
3.4 g. of $NaHCO_3$
1000.0 ml. of distilled water.

The muscle pulp is treated in the above solution for an hour while stirring the mixture several times, whereupon it is centrifuged. The supernatant liquid is diluted with 10 l. of distilled water and neutralized with a 1% hydrochloric acid solution. The precipitated protein is centrifuged and the precipitate is treated with 2×500 ml. of acetone, dried at room temperature, and pulverized. Thus about 40 g. myosin are obtained from 500 g. of muscle.

The Bioplast caps are stamped by using the following mixture:

0.4 g. of fibrin
1.6 g. of myosin powder
4.5 ml. of distilled water.

The components are mixed profoundly, the mixture is covered with a lid and allowed to stand for 1–2 hours. The mixture is then filled into a stamping-die preheated to 140° C. and stamped by using a pressure of 200 kp./cm.². After cooling the shaped piece is taken out and in order to regulate the absorption-time thereof it is put into a bath having the following composition:

|  | Ml. |
|---|---|
| 40% formaldehyde | 5 |
| 96% ethanol | 65 |
| 90% glycerin | 30 |

The preparation is kept in the bath for 6 hours. This ensures an absorption-time of 4–5 months. After the above treatment the piece is placed into a bath having the following composition:

|  | Ml. |
|---|---|
| 98% Ethanol | 50 |
| 90% ethylene glycol | 40 |
| Water | 10 |

The piece is kept in the above bath for 12 hours. After sterilization the cap is ready for being used by operation.

EXAMPLE 3

Preparation of Bioplast shaped pieces for the elevation of urethra (operation of incontinentia urinea) from myosin and actin powder and fibrin The mixture of myosin and actin-powder is prepared from 500 g. of ground muscle. The isolation is carried out by using a solution having the following composition:

45 g. of KCl
1 g. of $Na_2CO_3$
4 g. of $NaHCO_3$
1000 ml. of distilled water.

The muscle-pulp is treated in the above solution for 24 hours while stirring the mixture several times. The mixture obtained is then centrifuged. The supernatant liquid is diluted with 15 l. of distilled water and neutralized with a 1% hydrochloric acid solution. The precipitated proteins are centrifuged and the precipitate is treated with 2×600 ml. of acetone, dried at room-temperature and powdered. The powder thus obtained is screened. Thus about 60 g. of a powder-mixture consisting of myosin and actin are obtained from 500 g. of muscle.

The Bioplast sheet is stamped by using the following mass:

6 g. of a powder-mixture consisting of myosin and actin
2 g. of a fibrin-powder
4 ml. of distilled water.

The components are admixed profoundly and allowed to stand for an hour. The mixture is then placed into a chromed stamping die pre-heated to 150° C. (plane surface: 30 x 100 mm.) and stamped under a pressure of 300 kp./cm.². Bean-shaped and bean-sized pieces are cut from the sheet obtained (thickness: 4 mm., length; 20 mm.). Two holes are bored into the sheet-pieces for the surgical suture.

In order to adjust the absorption time of the sheets a bath having the following composition is used:

|  | Ml. |
|---|---|
| 40% formaldehyde | 2 |
| 98% ethanol | 60 |
| 90% glycerin | 38 |

The preparations are kept in the bath for 2 hours whereupon they are placed into a further bath for ceasing the effect of formaldehyde. The above treatment ensures an absorption-time of about 5 weeks.

What is claimed is:

1. A method of producing a prosthetic appliance adapted to be inserted into an animal body and being adsorbable by the animal body in a determined time period, comprising clotting blood plasma by the addition of calcium chloride to form fibrin, removing said clotted fibrin from said plasma, forming a powder of said clotted fibrin, mixing said powdered fibrin with water, molding said mixture under a pressure of from about 100 to 600 kg./cm.² at a temperature of from about 100° C. to about 150° C. to form a shaped prosthetic appliance and thereafter treating said shaped prosthetic appliance with a bath containing from 0.5% to 3% of formaldehyde, 30 to 70% ethanol and 10% to 40% of a polyhydric alcohol.

2. The process of claim 1 wherein said clotted fibrin is mixed with a protein selected from the group consisting of myosin, actin, collagen, elastin and mixtures thereof.

3. The process of claim 1 wherein said polyhydric alcohol is glycerine.

4. A method of producing a prosthetic appliance adapted to be inserted into an animal body and being adsorbable by the animal body in a determined time period, comprising clotting blood plasma by the addition of calcium chloride to form fibrin whereby the fibrin stabilating factor is maintained in the clot, removing said clotted fibrin from said plasma, grinding the clotted fibrin and drying under atmospheric pressure at room temperature, milling the fibrin to a powder, mixing said powdered fibrin with water, molding said mixture under a pressure of from about 100 to 600 kg./cm.² at a temperature of from about 100° C. to about 150° C. to form a shaped prosthetic appliance and thereafter treating said shaped prosthetic appliance with a bath consisting of 0.5% to 3% of formaldehyde, 30 to 70% ethanol and 10% to 40% of a polyhydric alcohol, whereby a maximum of 6% water is present.

References Cited

UNITED STATES PATENTS

| | | | |
|---|---|---|---|
| 887,130 | 5/1908 | Schmidt | 8—94.11 |
| 1,786,488 | 12/1930 | Homberg | 106—124 |
| 2,053,850 | 9/1936 | Sturken | 260—112 X |
| 2,385,802 | 10/1945 | Ferry | 106—124 |
| 2,385,803 | 10/1945 | Cohn et al. | 106—124 |
| 2,492,458 | 12/1949 | Bering | 167—74 |
| 2,533,004 | 5/1950 | Morrison et al. | 128—335.5 |
| 2,576,006 | 11/1951 | Morrison et al. | 260—112 X |

OTHER REFERENCES

Nance: Jour. Pharm. & Pharmacology, vol. 2, May 1950, pp. 273–85.

DALTON L. TRULUCK, Primary Examiner

U.S. Cl. X.R.

128—335.5; 3—1; 264—340